United States Patent Office 3,167,478
Patented Jan. 26, 1965

3,167,478
COLOR STABILIZED HAIR DYE COMPOSITION OF AMMONIA AND TRIHYDROXYBENZENE
Roger Charle, Soisy-sous-Montmorency, and Robert Lantz, Paris, France, assignors to L'Oreal
No Drawing. Filed Mar. 21, 1963, Ser. No. 266,822
Claims priority, application France, Jan. 8, 1958, 755,455
4 Claims. (Cl. 167—88)

It is already known to dye live hair and other keratinous fibers by impregnating them with a dyeing composition containing 1,2-trihydroxy-benzene, or a substitution derivative thereof, in the presence of ammonia, and then leaving the hair or fibers, thus impregnated, for a sufficient time in the presence of the oxygen of the air before washing, rinsing and drying them.

Despite its undeniable advantages, the aforesaid process sometimes exhibits the disadvantage that there is a change of the shade after the application and liberation of ammoniacal vapors.

It has now been found that this disadvantage is reduced or eliminated if ammonia is mixed with a solution of the trihydroxy-benzene derivative, this mixture is allowed to "ripen" in the absence of air for at least 1 hour, and any excess of "free" ammonia remaining in the solution is eliminated by any known method, the composition then being employed to impregnate the hair. The mixture may previously have been brought into the form of a cream and may contain adjuvants currently employed in dyeing. The solution thus obtained may be utilized to effect the dyeing of live hair and of similar keratinic fibers, and even fibers of different nature, to ensure the production, within a reasonable time, of regular and reproducible shades.

There takes place in the solution containing the 1,2,4-trihydroxy-benzene, or substitution derivative thereof, and ammonia, a complex reaction which fixes all or part of the ammonia employed, depending upon its relative quantity in the solution and the period of ripening. In some cases, therefore, uncombined ammonia may remain. It is this ammonia, herein called "free ammonia" which is eliminated by any method known per se before the composition is put to use.

According to the present invention, therefore, a process for the preparation of a dyeing composition for dyeing live hair and other fibers, comprises forming a solution containing 1,2,4-trihydroxy-benzene, or a substitution derivative thereof, and ammonia, allowing the solution to ripen for at least one hour out of contact with air, and thereafter eliminating any free ammonia present by any method known per se. The elimination of the free ammonia can be effected by evaporation in a non-oxidizing atmosphere or by addition of an acid to form an ammonium salt.

The invention as stated above removes the excess ammonia after at least one hour and before a secondary reaction sets in, which action causes the dye to give an unsatisfactory result due to the reaction with excess ammonia. This requires therefore the removal of the excess of ammonia before 50 days has expired.

If the 1,2,4-trihydroxy-benzene or substitution derivative thereof is treated with ammonia and the amount of ammonia is not sufficient to react with all of the trihydroxy-benzene, the reaction will proceed to completion and it will be unnecessary to remove any excess ammonia to prevent the secondary reaction.

It is possible to regulate the shade obtained by reacting the 1,2,4-trihydroxy-benzene or its substitution derivative with excess ammonia by permitting the secondary reaction to initiate, and then terminating the reaction by removing the excess ammonia.

The invention further includes dyeing compositions obtained by the aforesaid process. Such compositions may contain adjuvants, such as reducing agents for improving the keeping properties, agents (other than ammonia or a product liberating ammonia) for adjusting the pH value, swelling or penetrating agents for facilitating the fixation of the dye into the hair and/or thickening or foaming agents.

The invention further includes the new composition of matter consisting of a solid salt intended for the preparation, by simple dissolution in water, of a dyeing composition of the aforesaid type, the said salt being obtained by treating the ripened solution of 1,2,4-trihydroxy-benzene (or derivative thereof) and ammonia with an excess of an acid such as hydrochloric acid, and then evaporating this solution.

According to a further aspect of the invention there is provided a process or dyeing live hair and other fibers, which comprises applying thereto a composition as set forth above, which contains no free ammonia. The process may be effected in various ways, of which the following are illustrative:

(a) The fibers are impregnated with the composition, atmospheric oxygen is allowed to act on the impregnated fibers and the fibers are then washed, rinsed and dried.

(b) An oxidizing agent or an oxidation catalyst is mixed with the composition before the hair or fibers are impregnated therewith. After a sufficient period (usually not exceeding 30 minutes at a temperature not exceeding 35° C.) the treated fibers are washed, rinsed and dried.

(c) The process is carried out in two stages, in the first of which the fibers are impregnated with the composition, rinsed and then impregnated in a second stage with a solution adapted to accelerate the development of the shade in the presence of the oxygen of the air.

(d) The fibers are first impregnated with the composition, rinsed, dried and then impregnated with an oxidizing solution which develops the shade.

The following examples will serve to illustrate the invention:

Example I

There is prepared a solution containing:

| | |
|---|---|
| 1,2,4-trihydroxy-benzene _____ g__ | 2.50 |
| Ammonia solution (containing 8.33 g. of gaseous ammonia per liter) _____ cc__ | 20 |
| Water, q.s. _____ cc__ | 100 |

This solution is kept out of contact with air for 5 days. Grey hair is then impregnated therewith, with the aid of a brush or a pad, and left in contact with the air at ambient temperature for 15 minutes. The hair is thereafter rinsed with water and shampooed.

The hair is dyed black.

Example II

There is prepared a solution containing:

| | |
|---|---|
| 1,2,4-trihydroxy-benzene _____ g__ | 12.50 |
| Ammonia solution (containing 81.6 g. of gaseous ammonia per liter) _____ cc__ | 82 |
| Water, q.s. _____ cc__ | 500 |

This solution is kept out of contact with air for 24 hours. There is then added:

Hydrochloric acid (22° Bé.) _____ cc__ 40

The acid solution thus obtained is thereafter evaporated to dryness in vacuo. The residue is then extracted, first with ether and then with anhydrous alcohol. The alcoholic solution obtained is evaporated in vacuo. It gives a light green crystalline residue which can be directly used for the preparation of a dyeing solution in the following manner:

2.5 g. of the crystals obtained and 2.44 g. of sodium carbonate are dissolved in water, the volume of which is made up to 100 cc.

Grey hair is impregnated with this solution and left in contact with the air for 30 minutes at ambient temperature, rinsed with water and shampooed.

The hair is dyed ash-brown.

*Example III*

There is prepared a solution containing:

| | |
|---|---|
| 1,2,4-trihydroxy-benzene _____g__ | 2.50 |
| Ammonia solution (containing 17 g. of gaseous ammonia per liter) _____cc__ | 10.50 |
| Water, q.s. _____cc__ | 100 |

This solution is kept out of contact with air for 24 hours. There are then added:

| | |
|---|---|
| Ammonium persulphate _____g__ | 0.50 |
| Glacial acetic acid _____cc__ | 2 |

Grey hair is then impregnated with the solution thus obtained and left in contact for 30 minutes at ambient temperature, rinsed, shampooed and dried. The hair is dyed reddish-brown.

*Example IV*

There is prepared a solution containing:

| | |
|---|---|
| 1-methyl-2,4,5-trihydroxy-benzene _____g__ | 2.77 |
| Ammonia solution (containing 17 g. of gaseous ammonia per liter) _____cc__ | 20 |
| Water, q.s. _____cc__ | 100 |

It is kept for 24 hours out of contact with air and 1 cc. of glacial acetic acid is then added. Grey hair is impregnated with the solution thus obtained. After a period of contact of 15 minutes, the hair is rinsed, and again impregnated with the aid of a brush or a cotton pad with a solution containing:

| | |
|---|---|
| Sodium carbonate _____g__ | 2.10 |
| Sodium bicarbonate _____g__ | 1.70 |
| Water, q.s. _____cc__ | 100 |

This alkaline solution is left in contact with the hair for 10 minutes, and the hair is then rinsed again and lightly shampooed. The hair is dyed dark brown.

*Example V*

There is prepared a solution containing:

| | |
|---|---|
| 1,2,4-trihydroxy-benzene _____g__ | 2.50 |
| Ammonia solution (containing 17 g. of gaseous ammonia per liter) _____cc__ | 22 |
| Water, q.s. _____cc__ | 100 |

The solution is kept out of contact with air for 24 hours at ambient temperature. There is then added:

| | |
|---|---|
| Glacial acetic acid _____cc__ | 1.60 |

Grey hair is impregnated with the solution thus obtained and left in contact therewith for 30 minutes at ambient temperature. The hair is rinsed and impregnated again with a solution containing:

| | |
|---|---|
| Hydrogen peroxide (30 vol.) _____cc__ | 1.60 |
| Sodium carbonate _____g__ | 8 |
| Water, q.s. _____cc__ | 100 |

This solution is left in contact with the air for 10 minutes and the hair is rinsed, shampooed and dried. The hair is dyed brown.

Oxidizing agents which may be employed, apart from air, for carrying out the process according to the invention include, in addition to hydrogen peroxide and the persulphates referred to above: the addition compound of hydrogen peroxide with urea, hypochlorites, perborates and N-chlorinated sulphonamides. These oxidizing agents may be mixed directly with the dyeing composition to impregnate the hair therewith, or they may be employed only in a second stage when the hair has been impregnated with the composition containing the trihydroxy-benzene derivative and after intermediate rinsing and drying.

This application is a continuation-in-part of prior pending application Serial No. 784,436, filed January 2, 1959, now abandoned.

What is claimed is:

1. In a process for the production of a composition for dyeing living hair which comprises:
   (a) preparing a solution containing a substance selected from the group consisting of 1,2,4-trihydroxybenzene and 1-methyl-2,4,5-trihydroxybenzene,
   (b) adding ammonia in excess of that necessary for the reaction, the improvement of
   (c) allowing the solution to react for a time of at least one hour to 50 days out of contact with the air, and
   (d) thereafter eliminating the uncombined ammonia by neutralizing with an acid whereby said solution, stored out of contact with the air, keeps at all times, its dyeing properties unchanged.

2. A process as claimed in claim 1 in which the acid is hydrochloric acid.

3. A process as claimed in claim 1 in which the acid is acetic acid.

4. In a process for the production of a composition for dyeing living hair which comprises:
   (a) preparing a solution containing a substance selected from the group consisting of 1,2,4-trihydroxybenzene and 1-methyl-2,4,5-trihydroxybenzene,
   (b) adding ammonia in excess of that necessary for the reaction, the improvement of
   (c) allowing the solution to react for a time of at least one hour to 50 days out of contact with the air, and
   (d) thereafter eliminating the uncombined ammonia by evaporation in a non-oxidizing atmosphere, whereby said solution, stored out of contact with the air, keeps at all times its dyeing properties unchanged.

No references cited.

LEWIS GOTTS, *Primary Examiner.*

JULIAN S. LEVITT, *Examiner.*